Figure 1:
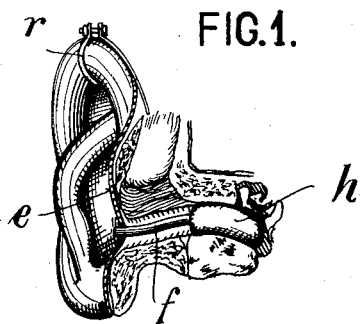

A. VON SUCHORZYNSKI.
EAR APPLIANCE FOR FACILITATING HEARING.
APPLICATION FILED APR. 1, 1912.

1,077,766.

Patented Nov. 4, 1913.

Witnesses:
Waldemar Haupt
Henry Harper

Inventor:
Anton von
Suchorzynski
by H. B. Willson & Co.
Attorneys

UNITED STATES PATENT OFFICE.

ANTON VON SUCHORZYNSKI, OF STEGLITZ, NEAR BERLIN, GERMANY.

EAR APPLIANCE FOR FACILITATING HEARING.

1,077,766.  Specification of Letters Patent.  Patented Nov. 4, 1913.

Application filed April 1, 1912. Serial No. 687,660.

*To all whom it may concern:*

Be it known that I, ANTON VON SUCHORZYNSKI, a subject of the German Emperor, residing at 1 Schildhornstrasse, Steglitz, near Berlin, Germany, have invented certain new and useful Improvements in Ear Appliances for Facilitating Hearing, of which the following is a specification.

The invention relates to an ear appliance for facilitating hearing and consists in one or more membranes with bent surfaces, which are either adapted as external ear membranes to the form of the outward part of the ear or as cranium membranes to the form of the head, being connected, by means of a small tube or rod, that is introduced into the auditory canal, with a small flexible membraneous bag. By this arrangement the middle of the ear is permanently connected at least with one large membrane arranged on the outward part of the ear or on the head. The large body of the membranes as well as the large surface for the sound waves to be intercepted enable the sound to be transmitted in an intensified degree to the interior of the ear, and in fact in the natural way through the middle of the ear, the auditory ossicles (malbus, incus and third ossicle or stirrup) of which in combination with the tympanic membrane, form the natural apparatus for the transmission of sound. The large cranium membranes, which have, for example, the form of a skull-cap, when firmly connected with the external ear membranes exercise together an effect which is increased many times in connection with the transmission of sound A matter of particular importance is the constitution of the flexible soft ending of the small tube or rod, which permanently maintains the contact with the tympanic membrane and the auditory ossicles. The best form is that of the india-rubber bag already known in connection with such purposes, which adapts itself to the space occupied by the osseous parts of the auditory canal and according to the invention is connected with the small thin tube or rod. The small india-rubber bags of this kind hitherto employed have been made, as is generally the case with india-rubber goods, of parts adhesively put together, so that unevenness occurred in places, which could not be obviated with the soft material. Such uneven places however acted injuriously after a time on the delicate membrane of the auditory canal. By the adhesive junction of single parts moreover it was impossible to obtain the precise form intended and the precise angular adjustment of the small membranes of the india-rubber bag, so that the desired close contact of these membranes with the tympanic membrane and the auditory ossicles could only be partially insured. A further disadvantage was caused through the length of the old device, which also filled up the cartilaginous outer part of the auditory canal. By movements of the lower jawbone in speaking or chewing the lumen or cavity of the cartilaginous part of the auditory canal underwent transitory changes, so that the device was easily shifted and thereby the transmission of sound impaired. Owing to the considerable obliquity of the tympanic membrane at the back and in the front as a consequence of which that membrane lies like a roof over the lumen or cavity of the osseous auditory canal, and the inward protuberance of the cartilaginous auditory canal itself (at the front and below) in the direction of the lumen the space conditions differ in different persons.

The present invention obviates the disadvantages mentioned. According to the invention the thin hollow body introduced into the auditory canal is made by a single piece of soft india-rubber and precisely adapted to the lumen of the osseous part of the auditory canal. Moreover this hollow body is provided with a side oval opening, corresponding to the inward bulging or protuberance of the front osseous wall of the auditory canal. By this arrangement a greater degree of flexibility and adaptability of the membrane to the different lumens or cavities of the auditory canal in different persons is made possible, as well as a permanent close contact between the small membrane of this hollow body and the tympanic membrane. The small outwardly directed opening of the hollow body serves for the introduction of the small tube or rod, which latter is seated as a connecting piece in the cartilaginous part of the auditory canal, and adapts itself to the windings of the auditory canal, but is made thinner than the lumen of the cartilaginous part of the auditory canal. The connection of the small tube or rod with the inner hollow body on the one hand and the outer external ear membrane, may be effected according to requirement firmly or movably and at one side or on both sides. The connection of the external ear membrane with the large cranium membrane may likewise be effected in any manner as preferred, and a direct connection be at once made in any manner as preferred between the cranium membranes and the inner hollow body.

Figure 2:
Figure 3:
Figure 5:
Figure 4:
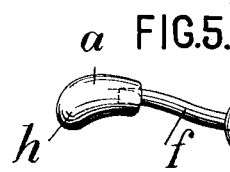
Figure 6:
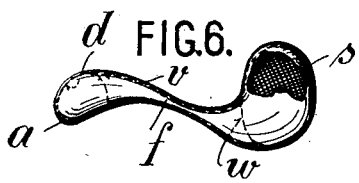
Figure 7:
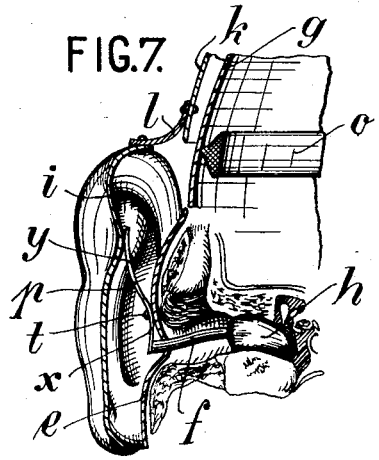
Figure 8:
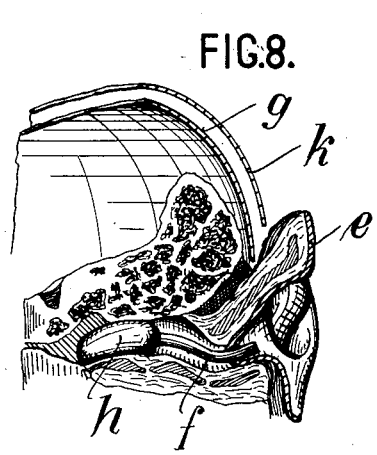

Figure 1 is a vertical section through the middle of a right ear, its auditory canal and an inserted hearing appliance with hollow body $h$; small tube $f$ and a single external ear membrane $e$. Fig. 2 is a horizontal section of the osseous auditory canal, while Fig. 3 is a transverse section of the same. Fig. 4 illustrates the interior part of the hearing appliance, hollow body $h$, with small tube $f$ in perspective front elevation with the front oval opening $b$ and the outwardly directed opening $c$, in which the small tube $f$ is firmly or movably arranged. Fig. 5 is a perspective back view of this inner part of the hearing appliance $h$ with the small obliquely placed conical membrane $a$, the connecting tube $f$ and a closed double membrane $s$ arranged on the outer end of the tube $f$. This form of the double membrane is smaller than the outer part of the ear and corresponds only to a recessed part of the same around the opening or mouth of the auditory canal (concha). In the form as in Fig. 6 the conical membrane $a$, the small tube $f$ and the concha membrane are made in one piece and in fact of flexible material, for example india-rubber. Figs. 7 and 8 relate to further examples of construction. Fig. 7 is a vertical section of the partially broken off double membranes $e$ and $i$ on the outer part of the right ear, and the partially broken off cranium membranes $g$ and $k$ in combination, one below the other, with $l$; as well as the external ear membrane $e$ in combination with the small tube $f$ and the inner hearing apparatus $h$. Fig. 8 is a horizontal longitudinal section of the left ear with portions of the partially broken off double membranes $e$ and $i$ of the external ear membranes, and of those of the head $g$ and $k$.

When a hearing appliance has been introduced into the auditory canal and has forced out the air, the small membrane $a$ holds the small india rubber bag so firmly against the tympanic membrane that the requisite pressure on the tympanic membrane or auditory ossicles can be regulated as desired by moving the hearing apparatus lightly to and fro. In particular, depressed tympanic membranes can be put in the normal position and retained there by slightly drawing out the hearing apparatus. In a further form of the inner part of the acoustic appliance a similarly shaped gold-sheet cone $d$ Fig 4 is fixed inside the small conical membrane $a$. In this combination, even with massive metal cones the vibrations of the membranes are more forcibly transmitted to the tympanic membrane and the auditory ossicles. This inner bag like part of the acoustic appliance is made in a number of sizes and in fact for children, young persons, persons of medium size and large size persons, in order to insure complete fitting according to the size of the auditory canal and the tympanic membrane.

The bent membrane $e$ of the acoustic appliance which has to be adapted to the form of the outward part of the ear, is best made by taking a cast for each individual. The shell like form of the ear will insure adequate fixing of the membrane made in imitation, so that the membrane only lies and is supported on a few places on the outward part of the ear. By this arrangement the membrane is at a slight distance so that it can oscillate without hindrance. Notwithstanding that the conchylaceous form in itself imparts a certain tension to the flexible material of the bent membrane, the ring $r$ (Fig. 1) surrounding the membrane is provided by the compression of which the membrane can be put under any desired tension. This ring $r$ which stretches around the circumference of the external ear membrane, lies with its lower edges to a certain extent against the outward part of the ear and in this way also enables the external ear membrane to be at a slight distance.

In the membrane for the outer part of the ear the part corresponding to the back of the ear is formed suitably to the ear, so that it lies in all places precisely against the ear and thereby above the membrance obtains a secure hold on the ear. This membrane is then suitably provided with an edge or flange which lies behind the ear at the back of the head and thereby gives the membrane a still better hold.

For the slighter cases of hardness of hearing a smaller membrane suffices in the form of the concha of the outward part of the ear, that is the recessed part or cavity that surrounds the opening or mouth of the auditory canal. On the other hand in cases of a more serious nature the circumference of the external ear membrane $e$ may be enlarged, for the purpose of multiplying the sound transmitting effect on the inner part of the ear. The most suitable device for this purpose is a skull cap $g$, which is put on like a hat and can be firmly or movably connected with the external ear membrane as preferred. Inside this skull-cap membrane $g$ a narrow, band like horizontal piece $o$ is arranged which serves as a support strip and which being placed on the head lies against the forehead and the back of the head of the person who is hard of hearing, while all other parts of the hat membrane can oscillate freely. This support strip is arranged inside the hat and supported at points or places so that it can be moved as desired, and that the double sided unequal lever oscillations of the parts of the hat membrane situated on the near and the far sides of the line of support can be regulated as desired. The skull-cap membrane may be connected indirectly with the external ear membrane *e* as well as directly with the small tube or rod *f* firmly or movably arranged in any suitable places.

A further example of construction relates to the membranes *e* and *i* of the outward part of the ear and of the skull cap *g* and *h* arranged to overlap one another doubly and with a greater or less distance between them, so that a quantity of air is inclosed between them, which is caused to vibrate through the vibrations of the membranes and further increases the transmission of sound. In order to obviate any disturbing self vibrations of the membranes and of the inclosed quantity of air further suitably formed membranes may be introduced and the distances between the membranes be regulated as desired.

A further form of the invention relates to an ear appliance in which the second external ear membrane *i* is arranged at a greater or less distance above the lower one and is furnished with a lever having unequal arms *p* Fig. 7. The point of support *t* of the two arm lever is arranged on the lower external ear membrane *e*. The end of the short arm *x* of the lever is suitably fixed to the small tube *f*, that is to say is connected with the inner acoustic device, while the second arm *y* which is several times longer can be connected in suitable places with the second upper external ear membrane *i*. In this form of the invention of course the connection between the lower external ear membrane *e* and the small tube *f* is dispensed with. By this arangement the large amplitudes of the vibrating external ear membrane are transmitted in a many times reduced form to the middle part of the ear corresponding to the many times smaller form of the natural tympanic membrane, while inversely the energy of the transmitted sound waves is correspondingly increased. All the membranes of the external acoustic device may be made of any suitable flexible material preferably celluloid, wood, glass, metal, etc.

On the small conical metal plates *d* one or more fine metal wires *v* (Fig. 6) may also be fixed which run up to the concha membrane *s* and are there firmly soldered to a second small metal plate *w*, so that a rigid connection of the inserted metal pieces one with another is effected. The wires *v* are suitably embedded in the flexible material, so that no direct contact between the inserted metal pieces and the walls of the auditory canal is possible.

What I claim and desire to secure by Letters Patent is:—

1. An ear appliance comprising a membraneous bag adapted to lie against the tympanic membrane, membranes arranged outside of the auditory canal, a tubular member connecting said inner and outer membranes, one of said outer membranes conforming to the outer portion of the ear and the other to the head.

2. An ear appliance comprising a membraneous bag adapted to lie against the tympanic membrane, membranes adapted to be arranged outside of the auditory canal, a tubular member connecting said inner and outer membranes, one of said outer membranes conforming to the outer portion of the ear and the other to the head, and means for adjustably supporting the inner membrane.

3. An ear appliance comprising a membraneous bag adapted to lie against the tympanic membrane, membranes adapted to be exposed outside of the auditory canal, a tubular member connecting said membranes, one set of said outer membranes conforming to the outward portion of the ear and the other to the head, the external membranes being arranged one above the other and adjustable relative to each other for varying the quantity of air inclosed between said membranes.

4. An ear appliance comprising a membraneous bag designed to lie against the tympanic membrane, a plurality of membranes adapted to be arranged outside the auditory canal, one of said outer membranes conforming to the outer portion of the ear and the other to the cranium, a tubular member connecting the inner and outer membranes, levers connecting the external ear membranes with each other and with the inner membrane for increasing the sound vibrations corresponding to the size of the different membrane surfaces.

5. An ear appliance comprising a membraneous bag designed to lie against the tympanic membrane, a plurality of membranes adapted to be arranged outside the auditory canal, one of said outer membranes conforming to the outer portion of the ear and the other to the cranium, a tubular member connecting the inner and outer membranes, levers connecting the external ear membranes with each other and with the inner membrane for increasing the sound vibrations corresponding to the size of the different membrane surfaces, and tension devices connected with the outer membrane for varying the tension thereof.

6. An ear appliance comprising a membraneous bag adapted to lie against the tympanic membrane, membranes adapted to be exposed outside of the auditory canal, a tubular member connecting said membranes, one of said outer membranes conforming to the outer portion of the ear and the other to the head, said connecting tube being movably arranged on the inner membraneous bag and on the outer membranes for regulating the distance between them.

7. An ear appliance comprising a membraneous bag composed of one piece and having thin side walls the front portion thereof having an opening therein, a set of membranes adapted to conform respectively to the outer part of the ear and to the cranium of the user, and a tube connecting said inner and outer membranes.

8. An ear appliance comprising a membraneous bag for lying against the tympanic membrane, a plurality of outer membranes adapted to conform respectively to the outer part of the ear and to the head, a tube connecting said inner and outer membranes, the free surfaces of the outer membrane being bent to intercept the sound waves.

In testimony whereof I have affixed my signature, in presence of two witnesses.

ANTON von SUCHORZYNSKI.

Witnesses:
 WOLDEMAR HAUPT,
 HENRY HASPER.